United States Patent
Hasberg et al.

(10) Patent No.: US 10,451,426 B2
(45) Date of Patent: Oct. 22, 2019

(54) METHOD FOR DETERMINING THE POSITION AND ORIENTATION OF A VEHICLE

(71) Applicant: Robert Bosch GmbH, Stuttgart (DE)

(72) Inventors: Carsten Hasberg, Ilsfeld-Auenstein (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/757,060

(22) PCT Filed: Aug. 29, 2016

(86) PCT No.: PCT/EP2016/070287
§ 371 (c)(1),
(2) Date: Mar. 2, 2018

(87) PCT Pub. No.: WO2017/037005
PCT Pub. Date: Mar. 9, 2017

(65) Prior Publication Data
US 2018/0252537 A1    Sep. 6, 2018

(30) Foreign Application Priority Data
Sep. 4, 2015    (DE) .................. 10 2015 216 970

(51) Int. Cl.
*G01C 21/32* (2006.01)
*G01C 21/16* (2006.01)

(52) U.S. Cl.
CPC ............. *G01C 21/32* (2013.01); *G01C 21/16* (2013.01)

(58) Field of Classification Search
USPC ........................................................ 701/451
See application file for complete search history.

(56) References Cited

U.S. PATENT DOCUMENTS

| | | | |
|---|---|---|---|
| 6,445,983 B1 | 9/2002 | Dickson et al. | |
| 2011/0057833 A1* | 3/2011 | France | G01S 19/32 342/357.25 |
| 2011/0239026 A1 | 9/2011 | Kulik | |

(Continued)

FOREIGN PATENT DOCUMENTS

| | | |
|---|---|---|
| DE | 102005025478 A1 | 12/2006 |
| DE | 102008013366 A1 | 9/2009 |
| JP | 2008185507 A | 8/2008 |

OTHER PUBLICATIONS

International Search Report dated Nov. 3, 2016, of the corresponding International Application PCT/EP2016/070287 filed Aug. 29, 2016.

*Primary Examiner* — Lail A Kleinman
*Assistant Examiner* — Mahmoud M Kazimi
(74) *Attorney, Agent, or Firm* — Norton Rose Fulbright US LLP; Gerard Messina

(57) ABSTRACT

A method and device for determining a spatial position of a mobile unit, the spatial position being determined within a predefined orientation system, as a function of a predetermined number of parameters; a sufficiently known spatial position of the mobile unit being determined, using a subset of the predetermined number of parameters, as a function of operating state values, which represent the operating state of the mobile unit, and/or of surrounding-area values, which represent the surrounding area of the mobile unit.

18 Claims, 3 Drawing Sheets

(56) References Cited

U.S. PATENT DOCUMENTS

2012/0158296 A1    6/2012  Waters et al.
2013/0271318 A1*  10/2013  Doucet .................. G01S 19/25
                                                          342/357.64
2013/0342393 A1*  12/2013  O'Connor ............... G01S 19/28
                                                          342/357.25
2014/0129175 A1    5/2014  Poduri et al.

* cited by examiner

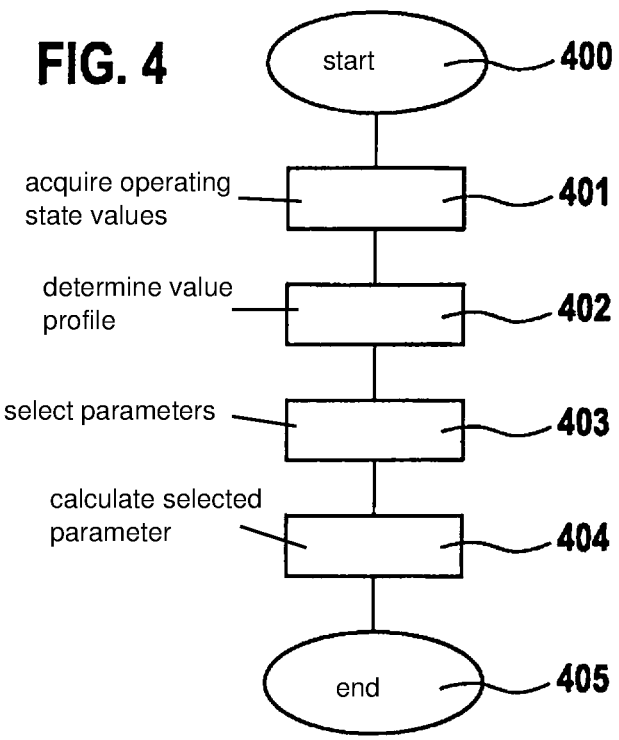
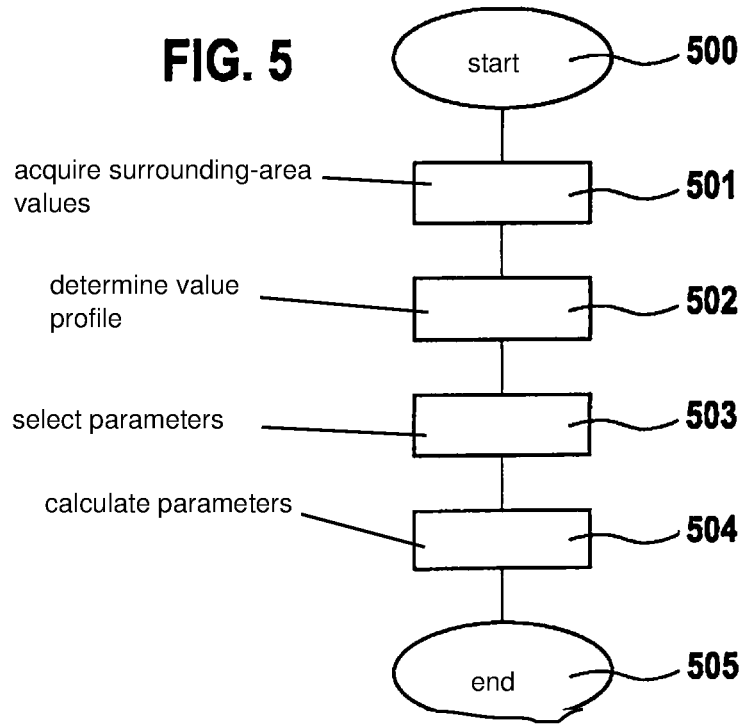

METHOD FOR DETERMINING THE POSITION AND ORIENTATION OF A VEHICLE

FIELD

The present invention relates to a method and a device for determining a spatial position of a vehicle, such as its position and/or its orientation.

BACKGROUND INFORMATION

German Patent Application No. DE 10 2008 013 366 A1 describes a method for providing information for driver assistance systems, where object characteristics of objects in the surrounding area are provided by a measurement data processing unit of a motor vehicle equipped with surround sensors.

German Patent Application No. DE 10 2005 025 478 A1 describes a method for determining the relative position, speed, acceleration and/or the center of rotation of a body movable in a three-dimensional space. In this context, signals and characteristic quantities are acquired with the aid of sensors provided, and the position and orientation are described in a coordinate system fixed with respect to a body.

SUMMARY

An example method of the present invention and/or an example device of the present invention relate to the determination of a spatial position of a mobile unit, the spatial position being determined within a predefined orientation system as a function of a predetermined number of parameters.

The mobile unit may include unmanned vehicles, such as a drone, or also manned vehicles, such as ships, airplanes, or also two- and four-wheeled motor vehicles.

In accordance with the present invention, as a function of operating state values, which represent the operating state of the mobile unit, and/or of surrounding-area values, which represent the surrounding area of the mobile unit, a sufficiently known spatial position of the mobile unit is determined, using a subset of the predefined number of parameters.

The example method of the present invention has the advantage that the attitude of a mobile unit, that is, its position and/or orientation, is determined, using only a portion of all of the possible parameters. This saves, first of all, computational time in the determination of the attitude, and secondly, computing power, since in the case of computing only a portion of the parameters, computing capacity, e.g., of a control unit, may be dispensed with. Conversely, in the case of full utilization of the available computing capacity, the parameters, which are selected as necessary, may, for example, be calculated more accurately, since more computing power is available for calculating an individual parameter. This may signify a crucial advantage for the safety of a mobile unit, such as, for example, in highly automated driving, where the attitude is of the highest importance for safe navigation. In particular, in highly automated driving, the rapidity of the determination of the above-mentioned parameters makes a large difference, since in the case of evasive maneuvers in response to dangerously approaching objects, accurate and rapid knowledge of the attitude may be of great and safety-related significance.

The sufficiently known spatial position is preferably only determined, using a necessary subset of the predetermined number of parameters.

In this context, necessary subset of parameters means that precisely the parameters are contained in the subset, which describe the sufficiently known spatial position without additional parameters having to be determined. On the basis of this procedural manner, only the necessary information, which is absolutely necessary for the function in question, is determined and passed along to other functions. This means that not only computing capacity is saved, but also data sets remain more clear and are processed and evaluated more easily.

In one particularly preferred specific embodiment, the subset of the predetermined number of parameters is a function of the operating state values and/or surrounding-area values. Due to the functional relationship of the parameters with operating state values and/or surrounding-area values, the correct subset of parameters may be ascertained more easily and assigned to the specific function.

The predetermined number of parameters, by which the spatial position of the mobile unit is completely determined, preferably includes three location parameters and three angular parameters.

Using the knowledge of three location parameters and three angular parameters, a spatial position, that is, both the position and the orientation within a three-dimensional space, is clearly described.

The operating state values and/or the surrounding-area values are preferably determined with the aid of at least one sensor of the mobile unit.

An advantage of this is that the operating state values and/or the surrounding-area values are determined both in real time and in the immediate vicinity of the mobile unit. In this manner, a position of the mobile unit may be determined immediately, and the subset of parameters, which are necessary for this, is determined for the mobile unit on the basis of actual spatial and temporal conditions.

In one particularly preferred specific embodiment, a sufficiently known spatial position of the mobile unit is determined, using a subset of the predetermined number of parameters, by assigning the operating state values and/or the surrounding-area values to value profiles and assigning each value profile a subset of the predetermined number of parameters.

Assigning the parameters to value profiles is an effective method for setting the correct parameters, and thus, the parameters necessary for determining a sufficiently known spatial position. In this manner, the parameters actually necessary may be determined as rapidly as possible and passed along to corresponding functions.

Preferably, the value profiles are stored on a storage medium, which belongs to the mobile unit, and/or may be retrieved from an external data source and/or updated.

The option of retrieving surrounding-area profiles from an external data source and thereby updating value profiles previously saved and/or storing new value profiles on the storage medium, as well, increases the flexibility of the method, since foreign surrounding areas or operating states unknown to the method may also be acquired accordingly and the value profile appropriate for the specific state may be retrieved so as to be made available.

The subset of the predetermined number of parameters is preferably stored on the storage medium and/or transferred to a corresponding output unit.

The present invention provides a device for determining a spatial position of a mobile unit, the spatial position being determined within a predefined orientation system, as a function of a predetermined number of parameters. The device further includes first devices, with the aid of which a sufficiently known spatial position of the mobile unit is determined, using a subset of the predetermined number of parameters, as a function of operating state values, which represent the operating state of the mobile unit, and/or as a function of surrounding-area values, which represent the surrounding area of the mobile unit.

The device preferably includes second devices, with the aid of which the sufficiently known spatial position is determined, using only a necessary subset of the predetermined number of parameters; and/or third devices, with the aid of which the operating state values and/or the surrounding-area values are determined, using at least one sensor of the mobile unit.

In one particularly preferred specific embodiment, fourth devices are provided, by which the operating state values and/or the surrounding-area values are assigned to value profiles.

A storage medium, which belongs to the mobile unit, and on which the value profiles are stored, is preferably provided for the device.

Fifth devices, with the aid of which the value profiles are retrieved from an external data source and/or updated, are preferably provided.

BRIEF DESCRIPTION OF THE DRAWINGS

Exemplary embodiments of the present invention are represented in the figures and are explained in greater detail below.

FIG. 4 shows an exemplary embodiment for determining a spatial position of a mobile unit as a function of operating state values, which represent the operating state of the mobile unit.

FIG. 5 shows an exemplary embodiment for determining a spatial position of a mobile unit as a function of surrounding-area values, which represent the environment of the mobile unit.

DETAILED DESCRIPTION OF EXAMPLE EMBODIMENTS

Figure 1:
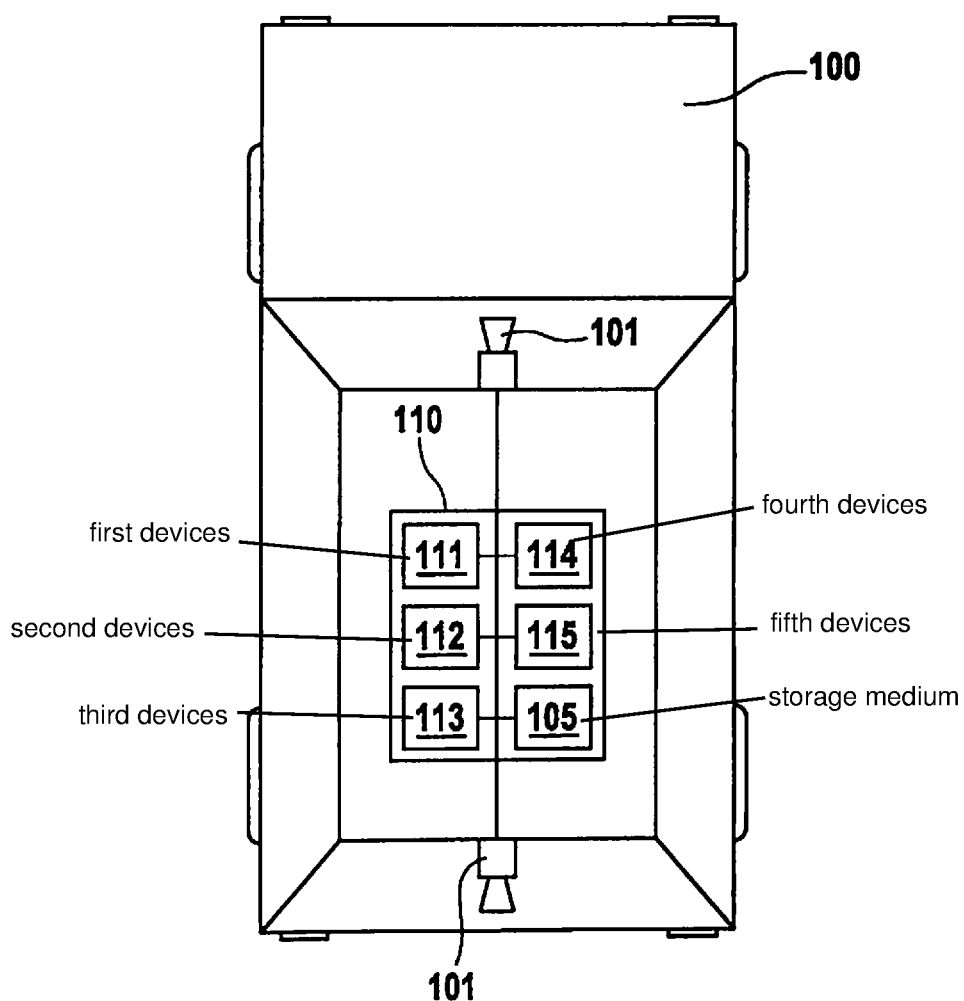
FIG. 1 shows a mobile unit, which is illustratively represented here as a four wheeled motor vehicle and includes the device of the present invention for determining the position and/or orientation.

In FIG. 1, mobile unit 100 is represented purely illustratively as a four-wheeled motor vehicle. The method of the present invention, as well as the device of the present invention, are suited for any type of vehicle. This means that mobile unit 100 may also be a ship, a hot-air balloon, or an airplane. The method is suitable for unmanned vehicles, as well, such as drones, or also highly automated cargo trucks.

In this context, device 110 of the present invention, as is represented here by way of example, includes first devices 111, with the aid of which it is possible to determine a sufficiently known spatial position as a function of an operating state and/or a surrounding area of mobile unit 100.

Using the second devices 112 present, the sufficiently known spatial position may be determined with the aid of only a necessary subset of parameters, which describe the position and/or orientation of mobile unit 100. The operating state and/or the surrounding area of mobile unit 100 may be determined with the aid of third devices 113, using operating state values and/or surrounding-area values, which may be acquired, in turn, by sensors 101, which are represented, here, as video sensors.

However, the sensors may be any type of sensors of a mobile unit 100, such as radar, lidar, temperature, moisture, acceleration, radio signal or also GPS sensors.

With the aid of fourth devices 114, the operating state values and/or the surrounding-area values are assigned to so-called value profiles. In the specific embodiment described here, the value profiles are stored on a storage medium 105, which belongs to device 110; fifth devices 115 also being present, by which the value profiles of an external data source are requested and downloaded. In the same way, value profiles already stored on storage medium 105 may be replaced with new and/or modified value profiles or added from the external data source.

In other specific embodiments, all of the value profiles are retrieved by fifth devices 115 as needed, or also only value profiles already stored on storage medium 105 are used for the method of the present invention.

In this context, each value profile is assigned a particular number and/or type of parameters as a function of the operating state values and/or the surrounding-area values, the number and/or type of parameters being used for determining a position and/or orientation of a mobile unit (100). That is, a particular operating state and/or a particular surrounding area may be detected as a function of the operating state values and/or the surrounding-area values, which are acquired by sensors 101, and consequently, a value profile may be called up. The sufficiently known position may be determined by the first devices 111 exemplarily depicted here, as a function of the value profile called up.

The spatial position of mobile unit 100, which is sufficiently known and is determined by the corresponding parameters, is transferred to an output unit, which is not specified and described in FIG. 1.

Figure 2:
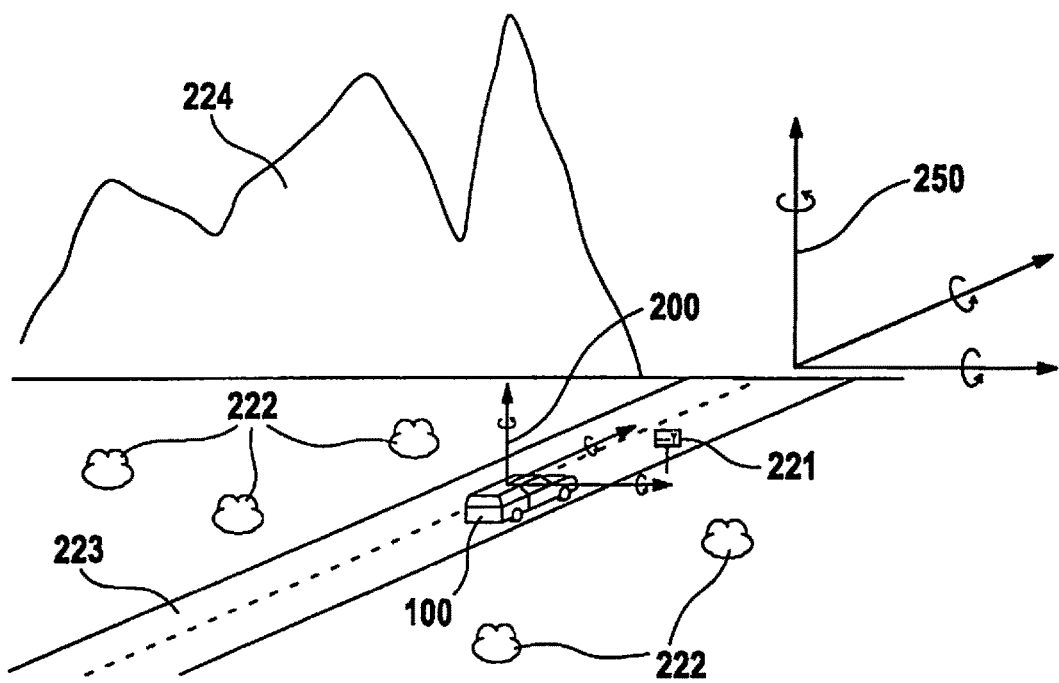
FIG. 2 shows a mobile unit, which is likewise represented illustratively as a four-wheeled motor vehicle, on a street, for example, a two-lane country road.

A possible surrounding area (221, 222, 223, 224) of mobile unit (100), which, here, is represented purely illustratively as a four-wheeled motor vehicle, is shown in FIG. 2. The street shown here by way of example may be a two-lane country road 223. In addition, purely by way of example, a sign 221, bushes 222, which are shown, here, as examples of plants of all types, and/or mountains 224, as well, are shown as further surrounding-area features that describe the environment of mobile unit 100. In light of these surrounding-area features, the environment may now be recorded in the form of surrounding-area values with the aid of sensors of mobile unit 100 (in the same way, the operating state of the mobile unit may be monitored by sensors in the form of operating state values).

If the surrounding-area values (and/or operating state values) are acquired, a value profile is now called up as a function of these acquired values, and consequently, the parameters, which are necessary in order to describe a spatial position 200 of mobile unit 100 within a predefined orientation system 250, are determined. In this context, predefined orientation system 250 is described by three location parameters and three angular parameters, as shown here illustratively by the three arrows, which indicate the three spatial directions, and by the three curved arrows, which indicate the orientation in the form of angles of rotation.

If the mobile unit is now located in a surrounding area, as shown here by way of example, a value profile is now called up, which is characterized, for example, by the term, country road, and it is suggested that only two of the three spatial directions are necessary for describing the position. If the reason for executing the method is, for example, to determine the position of mobile unit 100 for comparison with a position in a digital map, then a description of the position, which is described by the two parameters, latitude and longitude, would be sufficient. In this context, information about elevation is as unnecessary as the orientation in the form of the three angles of rotation. A comparable value profile would be applicable, for example, to a ship on the open sea, since a description of the position would also be sufficiently described by indicating the two parameters, longitude and latitude. If mobile unit 100 were an airplane, then, for example, information about elevation may also be necessary for a sufficiently accurate indication of the position.

Figure 3:
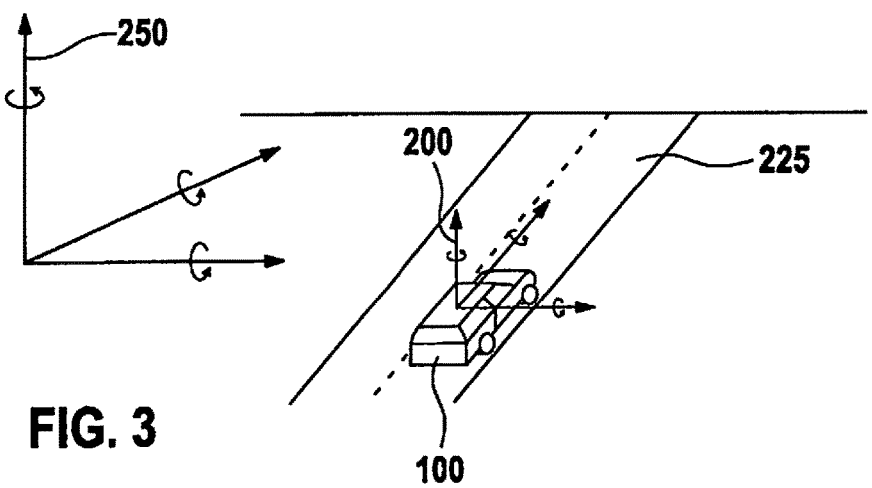
FIG. 3 shows a mobile unit, which is likewise represented illustratively as a four-wheeled motor vehicle, along with a surrounding area, which, in this case, is illustratively represented in the form of a road steeply ascending.

A further, possible surrounding area 225 in the form of a steep road is shown in FIG. 3 by way of example; mobile unit 100, in this case, represented, for example, as a four-wheeled motor vehicle, traveling upwards on the road. Orientation system 250 is indicated in the form of a coordinate system, as already described in FIG. 2. Here, when the method is appropriately called up, for example, in the event of a determination of the fuel consumption, information about the gradient could be important. In this case, the angle of inclination about the axis perpendicular to the moving direction of mobile unit 100 is the parameter necessary for determining spatial position 200 of mobile unit 100. A possible value profile could now be characterized by the term, gradient.

An exemplary embodiment of the method according to the present invention for a mobile unit 100 is schematically represented in FIG. 4.

In step 400, the method is started. This may occur, for example, via a function, which requires the sufficiently known spatial position of mobile unit 100.

In step 401, operating state values, which describe the operating state of mobile unit 100, are acquired by at least one sensor 101 of mobile unit 100. If mobile unit 100 is, for example, a four-wheeled motor vehicle, the speed of the vehicle may be determined as an operating state, with the aid of an engine speed sensor as at least one sensor 101. In the case of a four-wheeled motor vehicle, e.g., the frequency and/or the magnitude of the steering wheel angles may also be monitored, in order to establish the type of driving style and/or the present driving situation as an operating state.

If the mobile unit is a ship, then the activity of the propeller may be monitored as an operating state. In the case of an unmanned vehicle, such as a drone, ascending or descending, based on acceleration sensors, may be monitored as an operating state.

In step 402, a value profile, which is assigned a certain subset of parameters, is determined on the basis of the operating state of mobile unit 100. In this context, the appropriate value profile is called up as a function of the type of mobile unit 100 and/or function, which the spatial position of mobile unit 100 requires, and/or as a function of the at least one sensor 101 of mobile unit 100.

In the case of a high speed, which is detected via a high engine speed, then, for example, the value profile, expressway, which includes only two location parameters as parameters, is called up for a four-wheeled motor vehicle.

If mobile unit 100 is a drone, which is currently ascending or descending, then, for example, angular parameters are also necessary for a sufficiently known spatial position.

In step 403, the parameters assigned to the value profile are selected for determining a sufficiently known spatial position of the mobile unit as a function of the operating state, as was determined in step 401.

In step 404, the parameters selected in step 403 are calculated. The parameters not needed are disregarded, which means that, for example, the entire computing power is used for calculating the selected parameters.

In step 405, the method is ended by transferring the calculated parameters to, for example, the function, which requires the spatial position of mobile unit 100.

An exemplary embodiment of the method of the present invention for a mobile unit 100 is schematically represented in FIG. 5.

In step 500, the method starts, for example, by being called up by a function or also another method, which requires the determination of a spatial position 200 of mobile unit 100.

In step 501, surrounding-area values, which represent the surrounding area of the mobile unit, are acquired by at least one sensor 101 of mobile unit 100. In this context, the surrounding-area values may differ as a function of the function, which the method of the present invention calls up. If it is, for example, a function, which is intended to ensure the safety of mobile unit 100, then surrounding-area values must be considered that are different from the case in which it is a function, which the method needs to determine spatial position 200 of mobile unit 100 for a navigation device. Possible surrounding-area values may include, for example, signs, road markings, utility poles, or also certain landscape features.

In step 502, a value profile is determined on the basis of the surrounding-area values determined in advance, which represent surrounding area 221, 222, 223, 224, 225 of mobile unit 100. This value profile is assigned a certain subset of parameters, which are needed in order to determine a sufficiently known spatial position of mobile unit 100. If, for example, the safety of mobile unit 100 is ensured by a function, by executing an evasive maneuver, in which an approaching object is avoided as a function of the spatial position, then a value profile may be called up that is different from the case of another function, which does not include any safety-related aspect for mobile unit 100.

In step 503, the parameters assigned to the value profile are selected for determining a sufficiently known spatial position of the mobile unit.

In step 504, the parameters selected in step 503 are calculated.

In step 505, the method ends by transferring the calculated parameters, which describe the sufficiently known spatial position of mobile unit 100, to the function (or to the other method), which leads to the calling-up of the method of the present invention.

Of course, further exemplary embodiments and combined forms of the depicted examples are possible.

What is claimed is:

1. A method for determining a spatial position of a mobile unit, the spatial position being completely determined within a predefined orientation system, as a function of a predetermined number of parameters, the method comprising:

acquiring an operating state of the mobile unit using at least one sensor of the mobile unit;

selecting, based on the acquired operating state of the mobile unit, one of a plurality of stored value profiles, each of the plurality of stored value profiles being stored on a storage medium, each of the plurality of stored value profiles being assigned a respective subset of the parameters, each respective subset including less than all of the parameters; and determining, by a control unit of the mobile unit, a sufficiently known spatial position of the mobile unit by calculating only the respective subset of parameters assigned to the selected stored value profile and disregarding all other ones of the parameters.

2. The method as recited in claim 1, wherein the predetermined number of parameters by which the spatial position of the mobile unit is completely determined, includes three location parameters and three angular parameters.

3. The method as recited in claim 1, wherein the storage medium is a storage medium within the mobile device.

4. The method as recited in claim 1, wherein the sensor is: (i) at least one video sensor, and/or (ii) at least one radar sensor, and/or (iii) at least one lidar sensor, and/or (iv) at least one temperature sensor, and/or (v) at least one moisture sensor, and/or (vi) at least one acceleration sensor, and/or (vii) at least one radio signal sensor, and/or (viii) at least one GPS sensor, and/or (ix) at least one engine speed sensor.

5. The method as recited in claim 1, further comprising:
transferring the calculated parameters which describe the sufficiently known spatial position of the mobile unit to a function of the mobile unit.

6. The method as recited in claim 1, wherein the sufficiently known spatial position is a spatial position of the mobile unit that is calculated using less than all of the parameters.

7. The method as recited in claim 1, wherein the selected subset of the parameters includes only longitude and latitude.

8. The method as recited in claim 1, wherein the selected subset of the parameters includes only longitude, latitude, and elevation.

9. The method as recited in claim 1, wherein the predetermined number of parameters by which the spatial position of the mobile unit is completely determined includes three spatial directions, and three angles of orientation.

10. The method as recited in claim 1, wherein the control unit of the mobile unit includes a computer.

11. A method for determining a spatial position of a mobile unit, the spatial position being completely determined within a predefined orientation system, as a function of a predetermined number of parameters, the method comprising:

acquiring, via at least one video sensor of the mobile unit, surrounding area values which represent a surrounding area of the mobile unit;

selecting, based on the acquired surrounding area values, one of a plurality of stored value profiles, each of the plurality of stored value profiles being stored on a storage medium, each of the plurality of stored value profiles being assigned a respective subset of the parameters, each respective subset including less than all of the parameters; and determining, by a control unit of the mobile unit, a sufficiently known spatial position of the mobile unit by calculating only the respective subset of parameters assigned to the selected stored value profile and disregarding all other ones of the parameters.

12. The method as recited in claim 11, wherein the storage medium is a storage medium within the mobile device.

13. The method as recited in claim 11, further comprising:
transferring the calculated parameters which describe the sufficiently known spatial position of the mobile unit to a function of the mobile unit.

14. The method as recited in claim 11, wherein the sufficiently known spatial position is a spatial position of the mobile unit that is calculated using less than all of the parameters.

15. The method as recited in claim 11, wherein the selected subset of the parameters includes only longitude and latitude.

16. The method as recited in claim 11, wherein the selected subset of the parameters includes only longitude, latitude, and elevation.

17. The method as recited in claim 11, wherein the predetermined number of parameters by which the spatial position of the mobile unit is completely determined includes three spatial directions, and three angles of orientation.

18. The method as recited in claim 11, wherein the control unit of the mobile unit includes a computer.

* * * * *